United States Patent
Argolini et al.

(10) Patent No.: US 9,551,258 B2
(45) Date of Patent: Jan. 24, 2017

(54) CONTROL APPARATUS FOR OPTIMIZING THE REGENERATION OF AN AFTERTREATMENT DEVICE

(71) Applicant: GM GLOBAL TECHNOLOGY OPERATIONS LLC, Detroit, MI (US)

(72) Inventors: Roberto Argolini, Milan (IT); Giovanni Montinaro, San Pietro Vernotico (IT); Lorenzo Pataccia, Turin (IT); Davide Donna, Novara (IT); Thomas Johnen, Nieder-Olm (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 7 days.

(21) Appl. No.: 14/656,176

(22) Filed: Mar. 12, 2015

(65) Prior Publication Data

US 2015/0260074 A1    Sep. 17, 2015

(30) Foreign Application Priority Data

Mar. 14, 2014  (GB) .................................. 1404691.6
Mar. 14, 2014  (GB) .................................. 1408990.8

(51) Int. Cl.
| | | |
|---|---|---|
| *F01N 9/00* | (2006.01) | |
| *F01N 3/023* | (2006.01) | |
| *F01N 3/08* | (2006.01) | |
| *F02D 41/02* | (2006.01) | |
| *F02D 41/14* | (2006.01) | |
| *F01N 11/00* | (2006.01) | |

(52) U.S. Cl.
CPC ............... *F01N 9/002* (2013.01); *F01N 3/023* (2013.01); *F01N 3/0232* (2013.01); *F01N 3/0233* (2013.01); *F01N 3/0842* (2013.01); *F01N 9/00* (2013.01); *F02D 41/027* (2013.01); *F02D 41/1406* (2013.01); *F01N 2900/12* (2013.01); *F02D 2200/0625* (2013.01); *F02D 2200/606* (2013.01); *F02D 2200/701* (2013.01)

(58) Field of Classification Search
CPC ........ F01N 9/002; F01N 3/023; F01N 3/0232; F01N 3/0233; F01N 2430/00
USPC ....... 701/102, 23, 25, 408; 60/295, 274, 297
See application file for complete search history.

(56) References Cited

U.S. PATENT DOCUMENTS

| | | | |
|---|---|---|---|
| 7,987,667 B2 * | 8/2011 | Meier ..................... | F01N 3/031 60/277 |
| 8,015,805 B2 | 9/2011 | Pfaeffle et al. | |
| 8,035,532 B2 | 10/2011 | Vosz | |

(Continued)

FOREIGN PATENT DOCUMENTS

GB          2479196 A       10/2011

OTHER PUBLICATIONS

Great Britain Patent Office, Great Britain Search Report for Country Application No. 1404691.6, dated Oct. 28, 2014.

*Primary Examiner* — Mahmoud Gimie
(74) *Attorney, Agent, or Firm* — Lorenz & Kopf LLP

(57) ABSTRACT

A control apparatus is disclosed for optimizing the regeneration of an aftertreatment device located in an exhaust pipe of an internal combustion engine of a vehicle. The control apparatus includes an Electronic Control Unit configured to collect data from a GPS device associated to the vehicle, determine a time period for starting a regeneration of the aftertreatment device on the basis of data collected by the GPS device, and initiate the a regeneration of the aftertreatment device within the time period.

16 Claims, 12 Drawing Sheets

(56) References Cited

U.S. PATENT DOCUMENTS

| | | |
|---|---|---|
| 8,412,451 B2 | 4/2013 | Johnson |
| 8,881,505 B2 | 11/2014 | Frazier |
| 8,891,896 B2 | 11/2014 | Banner et al. |
| 2005/0166580 A1* | 8/2005 | Pfaeffle .................. F01N 3/023 60/295 |
| 2010/0043404 A1* | 2/2010 | Hebbale .................... F01N 9/00 60/286 |
| 2010/0154389 A1* | 6/2010 | Schumacher ........... F01N 9/002 60/286 |
| 2011/0088374 A1* | 4/2011 | Johnson ................. F01N 3/023 60/285 |

* cited by examiner

FIG. 6

Favorable Driver

City Profile

| | | | |
|---|---|---|---|
| Confidence Index | 0 | 0.5 | 1 |
| Physical Threshold | - - - | - - | - |

Extra Urban Profile

| | | | |
|---|---|---|---|
| Confidence Index | 0 | 0.5 | 1 |
| Physical Threshold | - - | - | |

Highway Profile

| | | | |
|---|---|---|---|
| Confidence Index | 0 | 0.5 | 1 |
| Physical Threshold | - | + | + |

Normal Driver

City Profile

| | | | |
|---|---|---|---|
| Confidence Index | 0 | 0.5 | 1 |
| Physical Threshold | - - | | |

Extra Urban Profile

| | | | |
|---|---|---|---|
| Confidence Index | 0 | 0.5 | 1 |
| Physical Threshold | - | | + |

Highway Profile

| | | | |
|---|---|---|---|
| Confidence Index | 0 | 0.5 | 1 |
| Physical Threshold | + | + | + + |

Critical Driver

City Profile

| | | | |
|---|---|---|---|
| Confidence Index | 0 | 0.5 | 1 |
| Physical Threshold | | | + |

Extra Urban Profile

| | | | |
|---|---|---|---|
| Confidence Index | 0 | 0.5 | 1 |
| Physical Threshold | + | + | + + |

Highway Profile

| | | | |
|---|---|---|---|
| Confidence Index | 0 | 0.5 | 1 |
| Physical Threshold | + + | + + | + + + |

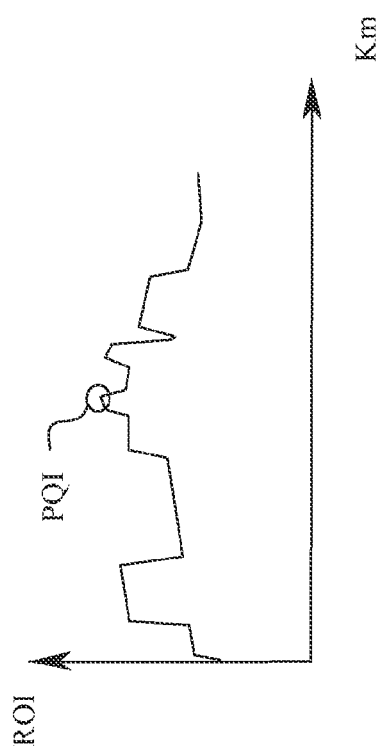
FIG. 12
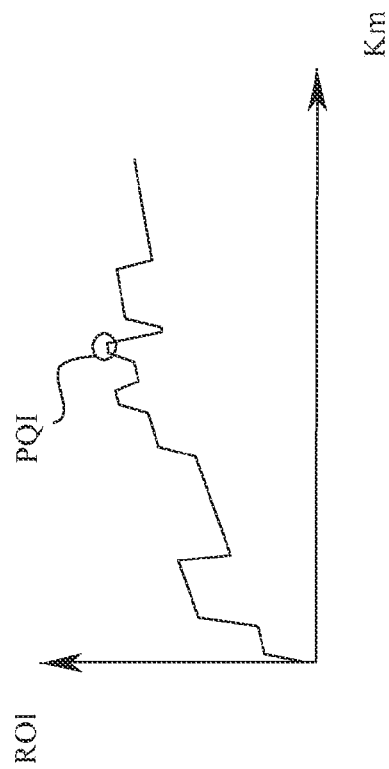
FIG. 13
FIG. 10
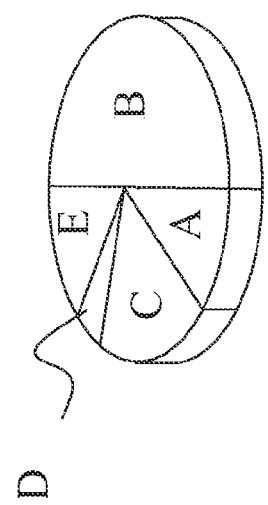
FIG. 11

FIG.16

CONTROL APPARATUS FOR OPTIMIZING THE REGENERATION OF AN AFTERTREATMENT DEVICE

CROSS-REFERENCE TO RELATED APPLICATION

This application claims priority to British Patent Application No. 1404691.6, filed Mar. 14, 2014, and to British Patent Application No. 1408990.8, filed Mar. 14, 2014, which are incorporated herein by reference in their entirety.

TECHNICAL FIELD

The present disclosure relates to a control apparatus for optimizing the regeneration of an aftertreatment device.

BACKGROUND

A compression ignition internal combustion engine (ICE) for a motor vehicle generally includes an engine block which defines at least one cylinder accommodating a reciprocating piston coupled to rotate a crankshaft. The cylinder is closed by a cylinder head that cooperates with the reciprocating piston to define a combustion chamber. A fuel and air mixture is cyclically disposed in the combustion chamber and ignited, thereby generating hot expanding exhaust gasses that cause the reciprocating movements of the piston. The fuel is injected into each cylinder by a respective fuel injector. The fuel is provided at high pressure to each fuel injector from a fuel rail in fluid communication with a high pressure fuel pump that increase the pressure of the fuel received from a fuel source.

After the expansion, the exhaust gases exit the combustion chamber and are directed into an exhaust system, which generally includes an exhaust pipe having one or more aftertreatment devices configured to fitter and/or change the composition of the exhaust gases, such as for example a Diesel Oxidation Catalyst (DOC), a Diesel Particulate Filter (DPF), a Lean NOx Trap (LNT), and/or a Selective Catalytic Reduction (SCR) system or a SCRF (SCR on Filter).

In order to guarantee and/or restore the efficiency of some of these aftertreatment devices, it may be necessary to perform suitable regeneration procedures. For example, the particulate matter that progressively accumulates inside a particulate filter (DPF) must be periodically removed to prevent an excessive pressure drop across the filter. This process, which is conventionally known as DPF regeneration, is achieved by increasing the temperature of the exhaust gases entering the DPF (typically up to 630° C.), which in turn heat the filter up to a temperature at which the accumulated particulate burns off.

A known strategy to increase the exhaust gas temperature provides for the exhaust gases to be mixed with a certain amount of unburned fuel (HC) that oxidizes in the oxidation catalyst, thereby heating the exhaust gases that subsequently pass through the DPR.

The unburned fuel may come from the engine cylinder thanks to the so called after or post-injections or, in some automotive systems, may be supplied by means of a dedicated fuel injector.

In order to start a DPF regeneration when the DPF is deemed bill of particulates, an Electronic Control Unit (ECU) of the vehicle continuously estimates the amount of emitted particulates since the last DPF regeneration on the basis of engine operating parameters. DPF regeneration is initiated as soon as those estimates by the ECU reach a predefined physical threshold.

DPF regeneration is preferably initiated during conditions requiring low EGR rates (e.g. less than 50%). For example, DPF regeneration is preferably initiated during cruising at highway speeds. DPF regeneration, however, can be initiated at less than optimum conditions if required.

Another aftertreatment device is the Lean NOx Trap (LNT), namely a device the traps nitrogen oxides (NOx) contained in the exhaust gas and is located in the exhaust line upstream of a Diesel Particulate Filter (DPF) In some embodiments, the LNT and the DPF are closely coupled in a single component.

The LNT is a catalytic device containing catalysts, such as Rhodium, Pt and Pd, and adsorbents, such as barium based elements, which provide active sites suitable for binding the nitrogen oxides (NOx) contained in the exhaust gas, in order to trap them within the device itself.

Also Lean NOx Traps (LNT) must be subjected to periodic regeneration processes or events, as soon as a physical threshold estimated by the ECU is reached, whereby such regeneration processes are generally provided to release and reduce the trapped nitrogen oxides (NOx) from the LNT. For this reason, Lean NOx Traps (LNT) are operated cyclically, for example by switching the engine from a lean burn operation to a rich operation, performing a regeneration event also referenced as DeNOx regeneration.

Also, in order to release accumulated sulphur from the LNT, DeSOx regeneration events are periodically performed by means of several rich combustion phases executed at high temperature, where gas temperature in the LNT may be around 650° C., each rich combustion phase being followed by a lean combustion phase, whereby this lean-to-rich-to-lean approach is also referred as wobbling approach. A DeSOx regeneration is generally performed at the same time during which a DPF regeneration is performed.

The LNT regenerations are obtained by operating the engine actuators, such as the injectors, the rail valve, the variable geometry turbine (VGT), the Exhaust Gas Recirculation system (EGD), the swirl valve, the throttle valve and the cooler bypass, all of which are moved to dedicated set points in order to achieve the desired combustion properties, using information coming mainly from temperature and lambda sensors positioned upstream and downstream of the LNT.

A problem with conventional systems is that a regeneration of an aftertreatment device, such as a DPF or a LNT, is generally started only on the basis of the physical needs of the aftertreatment device itself, as determined by a mathematical or statistical model of the physical conditions of the aftertreatment device with no regard to the mission profile of the vehicle or other variables. Consequently, a regeneration may, in many cases, be interrupted before it is completed or may be conducted at a low efficiency, for example in urban driving conditions, with consequently high oil dilution and high regeneration duration.

SUMMARY

The present disclosure provides a strategy for starting an aftertreatment device regeneration that takes into account the driving style of each particular driver and the actual mission profile of the vehicle in a simple, rational and inexpensive solution.

In an embodiment a control apparatus for optimizing the regeneration of an aftertreatment device located in an exhaust pipe of an internal combustion engine of a vehicle includes an Electronic Control Unit configured to collect data from a GPS device associated to the vehicle, and determine a time period for starting a regeneration of the aftertreatment device on the basis of data collected by the GPS device.

An advantage of this embodiment is that it benefits from the information provided by a OPS device associated to the vehicle to determine an optimal time for starting a DPF regeneration. This embodiment may also reduce the Incident Per Thousand Vehicles (IPTV) parameter and the number of not efficient or interrupted DPF and/or LNT cleaning procedures and the consequent number of DPF and/or LNT wrongly replaced at service.

A global positioning system (GPS) should be understood to be a position identification system yielding data with which, directly or indirectly via maps or other information, the geographical position of the vehicle in both latitude, longitude and optionally height, e.g. height above sea level, can be determined. GPS systems may also be other satellite based systems such as a Galileo or a Glonass system or even position identification system not making use of satellites.

According to an embodiment of the present disclosure, initiation of DPF regeneration is determined by calculating a physical threshold for starting a regeneration of the aftertreatment device, adjusting the physical threshold for starting the regeneration on the basis of data collected by the GPS device, and setting the adjusted threshold as the instant. An advantage of this embodiment is that the regeneration is performed in the best driving conditions possible, optimizing oil dilution and regeneration efficiency as well as fuel consumption.

According to another embodiment of the present disclosure, the physical threshold for DPF regeneration is based on determining an index representative of a driver profile on the basis of data collected by the GPS device, determining an index representative of a current mission profile of the vehicle on the basis of data collected by the GPS device, determining an index representative of the probability of starting and terminating a regeneration in the current mission profile, and adjusting the physical threshold for starting the regeneration as a function of the driver profile index the mission profile index and the regeneration index. An advantage of this embodiment is that the data collected by the GPS device understands in real time the actual mission profile in such a way to estimate the probability that the vehicle will be stopped or even switched off. The actual mission profile may also be used to gather information about the efficiency of a possible regeneration.

According to an embodiment of the present disclosure, the Electronic Control Unit is configured to determine the driver profile index as a function of the percentage of time spent in each mission profile. An advantage of this embodiment is that it determine, on the basis of statistical data collected by means of the GPS device, the type of profile that identifies each particular driver for use in order to adapt the regeneration to the particular driver.

According to another embodiment of the present disclosure, the Electronic Control Unit is configured to determine the mission profile index as a function of speed limit data read from the GPS device. An advantage of this embodiment is that the definition of the mission profiles using the GPS information may be useful to determine the type of road that the vehicle is in, and therefore useful to estimate, with an increased reliability, the conditions that affect the regeneration performances.

According to another embodiment of the present disclosure, the Electronic Control Unit is configured to determine the regeneration index as a function of the average time necessary for an aftertreatment device regeneration, the average time spent in each mission profile and a safety margin. An advantage of this embodiment is that it determines the probability that a regeneration will start and terminate in the current mission profile.

According to another embodiment of the present disclosure, the Electronic Control Unit is configured to determine the mission profile index as a function of a route calculated by a navigation system using the GPS device or GPS data. An advantage of this embodiment is that it calculates with a considerable precision the type of mission profile in which the vehicle will operate.

According to another embodiment of the present disclosure, the Electronic Control Unit is configured to determine an index ROI (t) representative of the efficacy of a regeneration in a time window t having a length equal to the duration of a regeneration of the aftertreatment device. An advantage of this embodiment is that it takes into account the main factors that influence the efficacy of a regeneration.

According to another embodiment of the present disclosure, the Electronic Control Unit is configured to determine a normalized regeneration index (NOI) according to the following formula:

$$NOI(t) = \frac{ROI(t)}{PQI}$$

wherein ROI (t) is the index representative of the efficacy of a regeneration in a time window t having a length equal to the duration of a regeneration of the aftertreatment device, and PQI is the index representative of the selected mission profile. An advantage of this embodiment is that it creates a normalized index that expresses a measure of the amount of adjustment needed for adjusting the regeneration physical threshold.

According to another embodiment of the present disclosure, the Electronic Control Unit is configured for starting the regeneration of a Diesel Particulate Filter according to the adjusted physical threshold. According to another embodiment of the present disclosure, the Electronic Control Unit is configured for starting the regeneration of a Lean NOx Trap according to the adjusted physical threshold.

Another embodiment of the present disclosure provides a method of optimizing the regeneration of an aftertreatment located in an exhaust pipe of an internal combustion engine of a vehicle. Vehicle position data from a GPS device associated to the vehicle is collected. A time period for starting a regeneration of the aftertreatment device is determined on the basis of data collected by the GPS device.

Another embodiment of the present disclosure provides an automotive system including an aftertreatment device located in an exhaust pipe of an internal combustion engine of a vehicle. The engine is managed by an engine Electronic Control Unit configured to collect data from a GPS device associated to the vehicle, and determine a time period for starting a regeneration of the aftertreatment device on the basis of data collected by the GPS device.

The method according to one of its aspects can be carried out with the help of a computer program including a program-code for carrying out the method described above, and in the form of computer program product including the computer program. The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

A still further aspect of the disclosure provides an internal combustion engine specially arranged for carrying out the method claimed.

BRIEF DESCRIPTION OF THE DRAWINGS

The present disclosure will hereinafter be described in conjunction with the following drawing figures, wherein like numerals denote like elements.

FIG. 6 is a table detailing a logic of an embodiment of the present disclosure;

FIGS. 10 and 11 show two examples of different weight distributions of the parameters of FIG. 9;

FIGS. 12 and 13 represent curves of the ROI over time respectively when the ROI is calculated according to the weight distribution of FIG. 10 or of FIG. 11;

FIG. 16 is a table detailing a logic of the embodiment of the present disclosure of FIG. 15.

DETAILED DESCRIPTION OF THE DRAWINGS

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
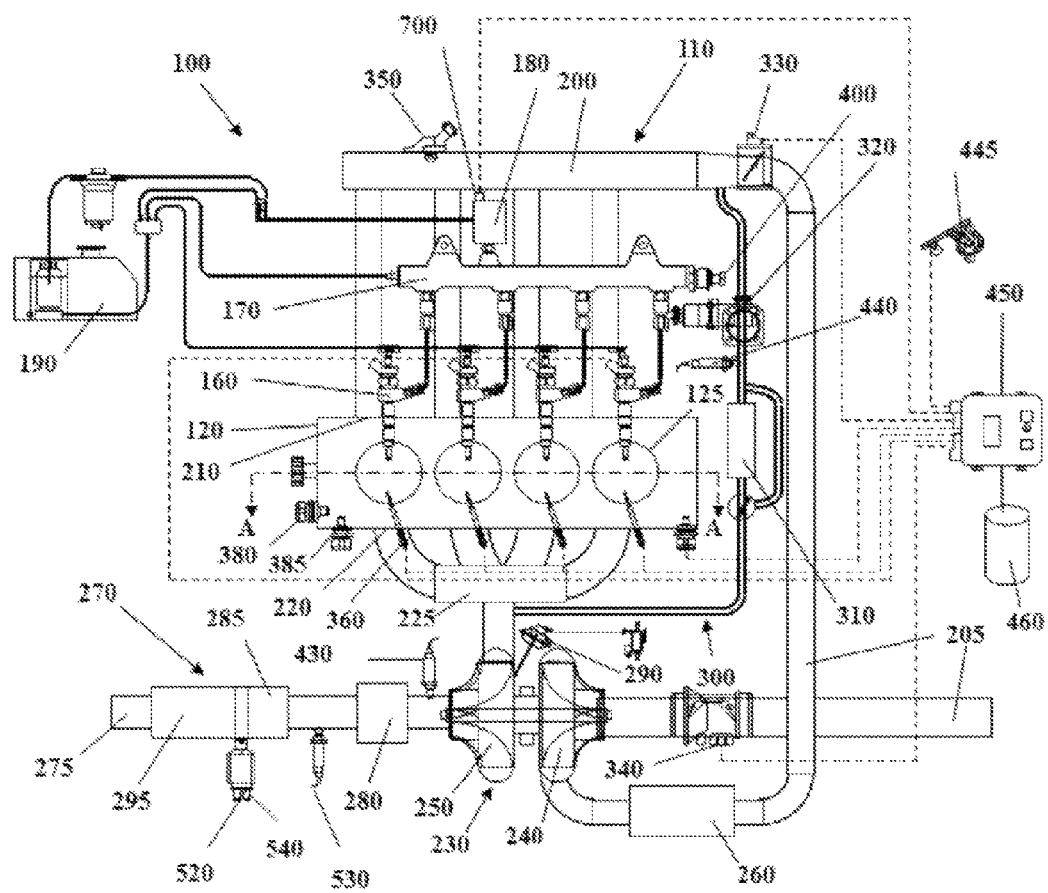
FIG. 1 shows an automotive system.
Figure 2:
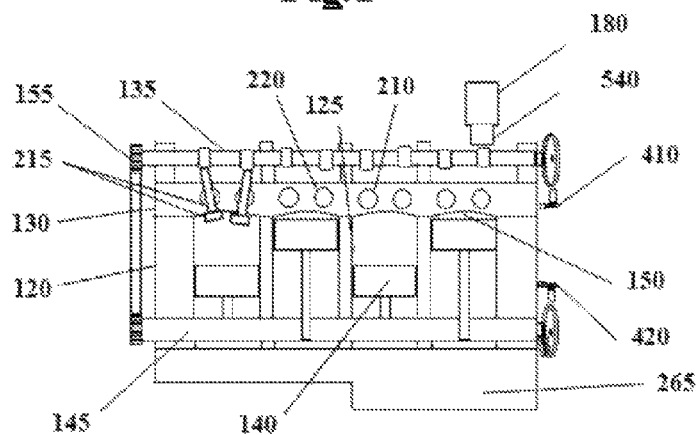
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices. The aftertreatment devices may be any device configured to change the composition of the exhaust gases. Some examples of aftertreatment devices 280 include, but are not limited to, catalytic converters (two and three way), such as a Diesel Oxidation Catalyst (DOC), a lean NOx trap 285, hydrocarbon adsorbers, selective catalytic reduction (SCR) systems, SCRF (SCR on Filter), and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, an exhaust pressure sensor and an exhaust temperature sensor, an EGR temperature sensor 440, a lambda sensor upstream 530 and a lambda sensor downstream 540 of any of the above mentioned catalysts, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
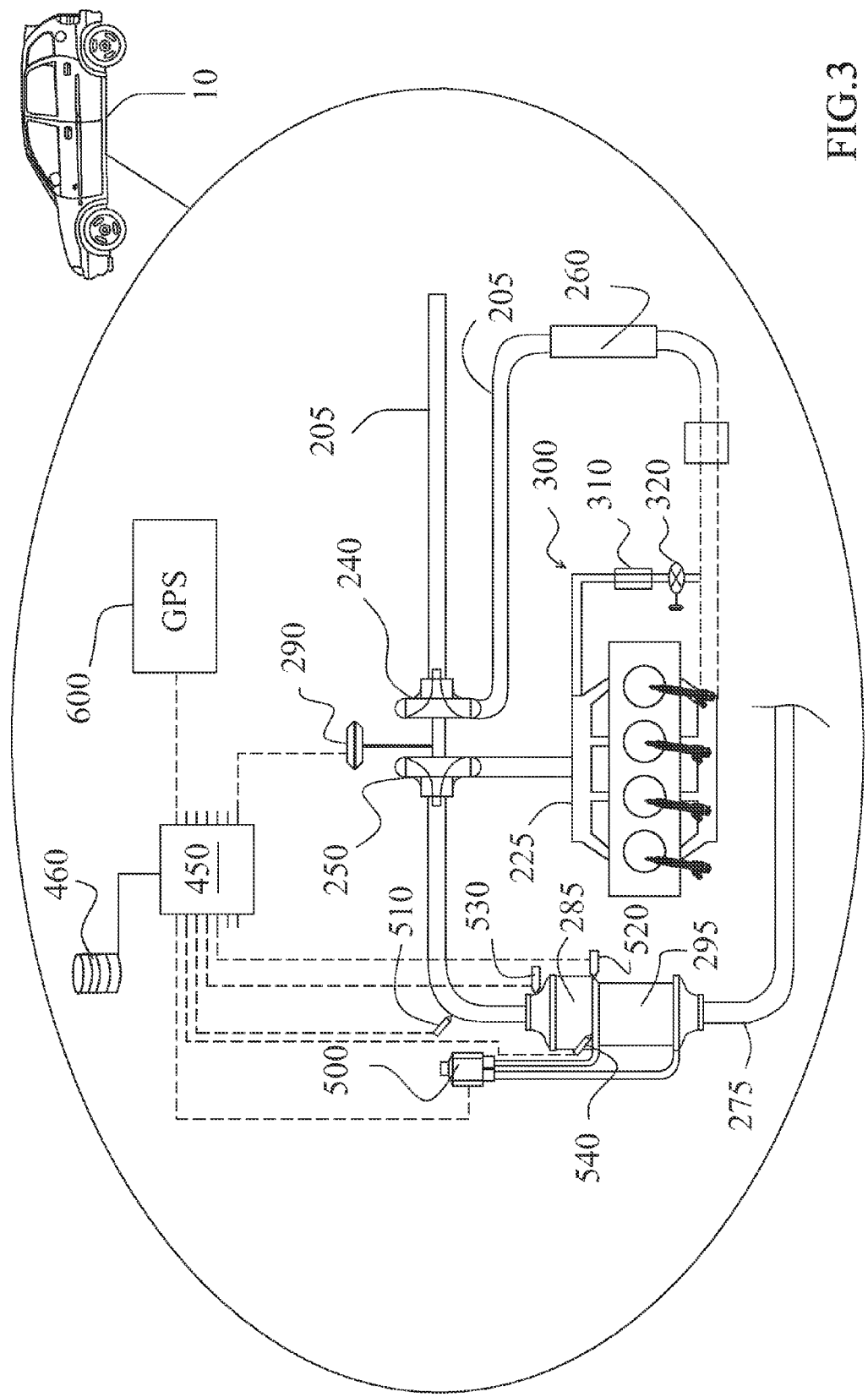
FIG. 3 is a schematic representation of some components of the automotive system employed in the various embodiment of the present disclosure.

More specifically, FIG. 3 shows a schematic representation of the some components of the automotive system 100 employed in the various embodiment of the present disclosure. The engine 110 is represented having the air intake duct 205 and the compressor 240 rotationally coupled to variable geometry turbine 250 equipped with actuator 290. In the exhaust line 275, aftertreatment devices are provided, in particular including a Lean NOx Trap 285 and a Diesel Particulate Filter 295. A pressure drop sensor 500 is provided across the DPF 295 to measure pressure drop across the DPI 295 and send corresponding signals to the ECU 450.

A temperature sensor 510 upstream of the Lean NOx Trap 285 and a temperature sensor 520 downstream of it are provided, both being connected to the ECU 450 to send signals therein. Furthermore, a lambda sensor 530 upstream of the Lean NOx Trap 285 and a lambda sensor 540 downstream of it are provided, both being connected to the ECU 450 to send signals therein.

A known procedure to start a DPF regeneration may be the following. Sensors information, models or estimations are evaluated inside the ECU 450 to decide whether a change of combustion mode is required. When the conditions calculated by the ECU 450 according to the physical conditions of the DPF are reached, the ECU 450 calculates and instant, namely a physical threshold, for starting the regeneration. When the physical threshold is reached, a DPF regeneration is started by increasing the temperature of the exhaust gases entering the DPF (typically up to 630° C.), which in their turn heat the filter up to a temperature at which the accumulated particulate burns off. Similarly, concerning the Lean NOx Trap 285 information coming from the mentioned sensors and suitable model of the Lean NOx Trap 285 are evaluated in order to determine the physical threshold for starting a LNT regeneration.

In this case, the ECU 450 commands the engine actuators, such as EGR Swirl valve, Throttle valve, VGT actuator, Rail Pressure Pump, and as above mentioned fuel injectors 160, in order to move them to dedicated set points that create an exhaust gas condition that is necessary to promote the chemical reactions in the LNT that are the base of each typical LNT phase, such as NOx storage, NOx conversion, SOx storage, SOx desorption. The ECU 450 may also be connected to a Global Positioning System (GPS) device 600 associated to the vehicle 10.

The GPS device 600 may be a device integrated into a navigation system installed on the vehicle 10 or may be used as stand-alone device data-coupled to the cockpit of the vehicle by an appropriate electronic interface, e.g. a cable connector or a Bluetooth connection, or may be a GSP sensor equipped on a smartphone and provided with map and/or navigation software, in the latter case communicating, e.g. via Bluetooth, with the vehicle 10.

The Electronic Control Unit 450 may be configured to read data from the GPS device 600. More specifically, the GPS device 600 is used to allow the ECU 450 to collect reliable data regarding some important information as the typical mission profile of each user and the actual mission profile of the vehicle. In this way it is possible to understand the specific characteristic of each driver, defined in terms of a driver profile index and then adapt the physical threshold, calculated in the manner above explained, for starting a regeneration of an aftertreatment device, such as the DPF or the LNT, according to each specific driver needs.

The various embodiment of the present disclosure will now be described with reference to a DPF regeneration, with the provision that the logic employed to adjust the physical threshold for starting the DPF regeneration can also be employed for adjusting the physical threshold for starting a LNT regeneration event, such as a DeNOx regeneration or a DeSOx regeneration event.

Figure 4:
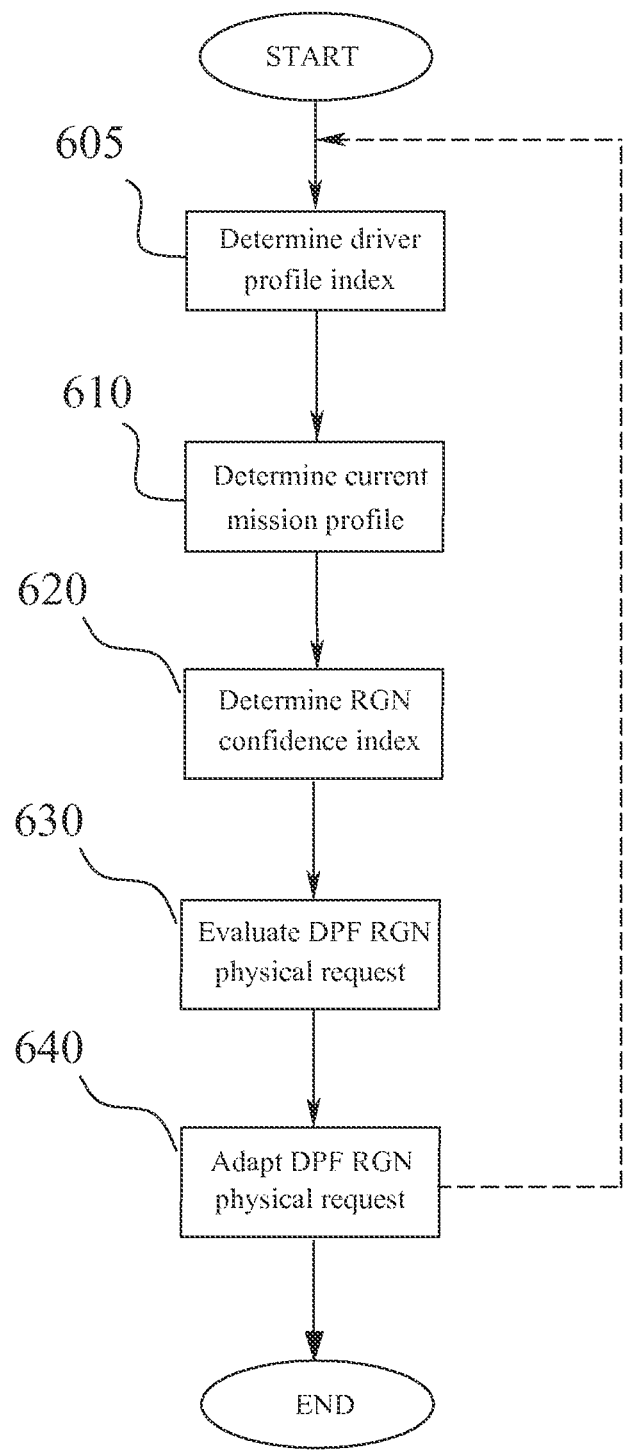
FIG. 4 is a flowchart of an embodiment of the present disclosure.

In FIG. 4 a flowchart of an embodiment of the present disclosure is represented. As first step, the ECU 450 determines a driver profile on the basis of data collected by the GPS device 600, namely performing calculations based on the previous driving history of the driver that will be explained in detail hereinafter (block 605). The driver profile may be represented by means of a driver profile index DriverProfIndex and used to improve the prediction of the mission profile of the vehicle 10.

Then the ECU 450 determines a current mission profile of the vehicle 10 on the basis of data collected by the (IFS device 600 (block 610). On the basis of the mission profile determined, the ECU 450 determines a DPF regeneration index Confidence representative of the probability of starting and terminating a DPF regeneration in the current mission profile (block 620).

At the same time, the ECU 450 evaluates a DPF regeneration request for example on the basis of a statistical model, or other estimations, that represent the DPF soot loading as a consequence of its operation during use of the vehicle 10 in the current mission profile (block 630). A DPF regeneration request may include a physical threshold that indicates the instant in which the regeneration procedure must be started.

Finally, the physical threshold for starting the DPF regeneration is adjusted as a function of the driver profile index DriverProfIndex, the mission profile and the DPF regeneration index (block 640). The driver profile index DriverProfIndex can be determined (block 605) on the basis of the percentage of time spent by a driver in each mission profile.

For simplicity three different mission profiles may be defined: Urban (U), Extra Urban (EX) and Highway (H), even if it is not excluded that different mission profiles and a different number thereof may be defined according to the applications. Another variable to be considered is the average time spent consecutively in each profile. Finally, DPF regeneration performances in each profile, considering regeneration length and efficiency may be considered.

The driver profile may be represented by means of a driver profile index DriverProfIndex and used to improve the prediction of the mission profile of the vehicle 10. The driver profile shall be evaluated for a certain number of kilometers, in order to collect enough information to identify the actual driver profile with a certain statistical accuracy. For example, the driver profile index DriverProfIndex may be calculated over the use of the vehicle for 2.000 km. A formula that may be used to calculate the driver profile index may be the following:

$$DriverProfIndex = \frac{\sum_{x=1}^{x=3} Percentage_{Profilex} * Weight_{Profilex}}{\sum_{x=1}^{x=3} Percentage_{Profilex}}$$

where x represent each of the defined mission profiles: Urban (U), Extra Urban (LX) and Highway (H).

Each of the weights WeightProfilex describe synthetically the estimated efficiency of the DPF regeneration in the respective profile, accounting for soot residual percentage and duration.

For example, the following weights may be used:
Weight Urban=0.2 (bad condition)
Weight Extra Urban=0.7 (good condition)
Weight Highway=1 (best condition).

As a result of the evaluation of the driver profile index DriverProfIndex, several categories of drivers can be defined. For example three categories may be defined by defining suitable ranges for the values of the variable DriverProfIndex: a Critical Driver profile that identifies a driver that mainly drives in an urban environment, a Normal Driver profile that identifies a driver that drives mainly in an Extra Urban environment and sometimes on highways and in an Urban environment and a Favorable Driver Profile that identifies a driver that mainly drives on highways and in an extra urban environment and seldom in an urban environment. Since the habits of a driver may change during time, the driver profile index DriverProfIndex may be periodically recalculated over time, as expressed by the dotted line in FIG. 4.

The determination of the current mission profile of the vehicle 10 on the basis of data collected by the GPS device 600 (block 610) is strictly correlated to the probability that the vehicle 10 will be stopped and/or switched off before the end of the regeneration procedure and also to the efficiency of a possible regeneration in a certain mission profile. The mission profile determination can be based on vehicle speed limits that can be read from the GPS, as a function of the type of road in which the vehicle 10 is located. For example, the following values may be used:
Urban (U) 0-70 km/h
Extra Urban (EX) 70-110 km/h
Highway (H) 110-130 km/h With this method an index RealProfileIndex that can assume the three above mentioned values can be determined.

The determination of the current mission profile using the above GPS information may be useful to take into account also users having very aggressive driving styles even in mission profiles, such as the Urban profile, where frequent stops or idles are present. In other words, by reading from the GPS device 600, the speed limits corresponding to the position in which the vehicle 10 is located, it is possible to better understand in which type of road the vehicle 10 is operating and, therefore, to have a more robust estimate of how often the conditions that affect the regeneration performances will be present.

Once the driver is driving in urban, extra urban or highway condition, it is important to estimate, based on his or her driver profile, how long probably he or she will stay in the same mission profile, in order to estimate the efficiency of the regeneration. This measure can be given by a DPF regeneration index ConfidenceIndexProfilex (block 620) that can be determined considering several variables.

A first variable to be considered is the average duration of the regeneration (which is dependent on the selected profile) RGN_EstimatedDurationProfilex. Such variable may be calculated over a wide range of number of samples identifying a normal distribution. The mean and the sigma, or standard deviation, of such distribution shall allow to identify the probability margin each driver have on the forecast. A good compromise may be a static percentage calculated over a kilometric moving window. A second variable to be considered is the average time spent during the standard driving in each profile by the driver, namely AverageTimeProfilex.

A safety margin SafetyMarginProfilex may be considered, such safety margin being based on the Gaussian dispersion, or other statistical analysis parameters, of the duration of the DPF regeneration in each profile. Such safety margin shall be calculated over a wide range of number of samples identifying a normal distribution. The sigma of such distribution shall allow to identify the probability margin each driver have on the forecast. A good compromise may be a static percentage calculated over a kilometric moving window.

With the above definitions, the DPF regeneration index ConfidenceIndexProfilex may be calculated with the following formula:

$$ConfidenceIndex_{Profilex} = \frac{RemainingTime_{Profilex}}{SafetyMargin_{Profilex} * RGN\_EstimatedDuration_{Profilex}}$$

where the variable RemainingTime$_{Profilex}$, that expresses the remaining time in which the user will stay in the same mission profile, may be calculated with the following formula:

$$RemainingTime_{Profile\ x}=AverageTime_{Profile\ x}-CurrentTime_{Profile\ x}$$

where the variable CurrentTimeProfilex indicates the current time in which the user is operating in the mission profile.

Once all the previous information are available to the ECU 450, it is then possible to adjust the physical threshold for starting the DPF regeneration as a function of the driver profile index DriverProfIndex, of the mission profile and the DPF regeneration confidence index ConfidenceIndexProfilex, in order to start the DPF regeneration in a time period where better conditions in terms of efficiency and duration with respect to the prior art can be found.

Figure 5:
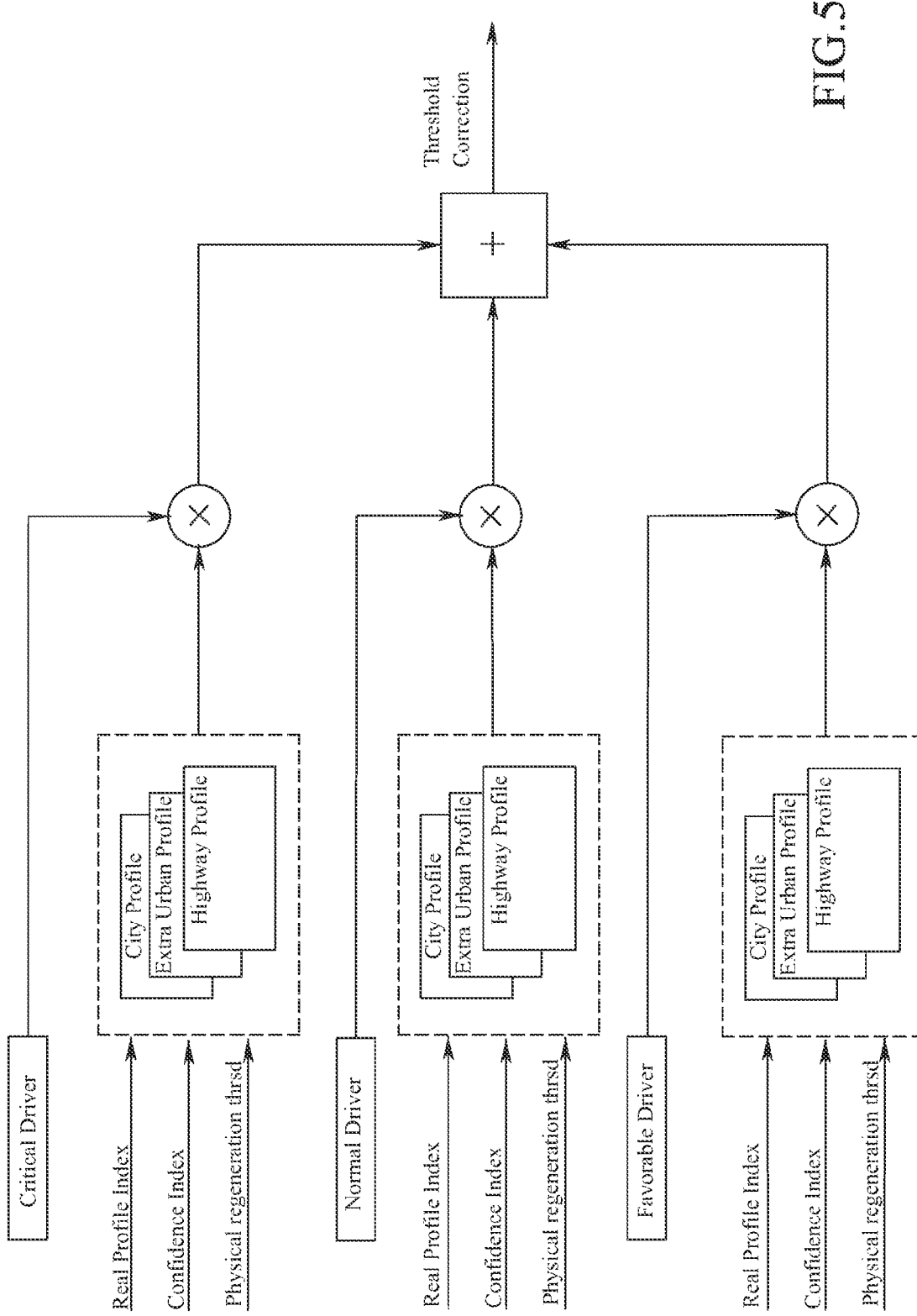
FIG. 5 is a flowchart detailing a logic of an embodiment of the present disclosure.

The variables used by the ECU 450 and their relationship are schematically depicted in FIG. 5. On the basis of the driver profile index DriverProfIndex, the ECU 450 identifies the type of driver currently driving the vehicle 10, for example, a Critical Driver or a Normal Driver or an Extra Urban. The ECU 0.450, on the basis of the driver profile identified, then analyzes the current mission profile that is representative of the driving conditions of the vehicle 10, such as Urban, Extra Urban and Highway in order to calculate the variable RealProfileIndex. Then the ECU 450 considers the DPF regeneration confidence index ConfidenceIndexProfilex for the specific mission profile.

With these information, the ECU 450 can now decide if it is convenient to modify the instant in which the DPF regeneration will start or not, adjusting the physical threshold for starting the regeneration. In many cases, according to the various embodiment of the present disclosure, the ECU 450 may decide to adjust the physical threshold for starting the regeneration by anticipating or delaying the start of the DPF regeneration to meet the best conditions to perform the DPF regeneration.

As a convention, in the table of FIG. 6, a negative or "−" sign indicates the opportunity of delaying the regeneration, a positive or "+" sign indicates the opportunity of anticipating the DPF regeneration. The amount by which the regeneration may be delayed or anticipated with respect to the physical threshold may vary, depending on the conditions, and these variations are expressed by the number of "+" or "−" signs for each of the possible cases that the ECU 450 may encounter.

For example, if the driver has a good profile, namely is classified by his or her driver profile index DriverProfIndex as a Favorable Driver, for example because such driver is normally driving 80% of the time in highway for an average of 1 hour. In case an urban mission profile is detected the ECU will delay the DPF regeneration threshold as much as possible to avoid to have a DPF regeneration during an urban mission profile. On the contrary, in case an highway mission profile is detected the DPF regeneration threshold may be anticipated. In general, the ECU will anticipate the DPF regeneration more in case of an high value of the DPF regeneration confidence index ConfidenceIndexProfilex. Once the type and the entity of the adjustment is determined, the ECU 450 is ready to perform a regeneration when the instant in time corresponding to the adjusted threshold occurs.

According to another embodiment of the present disclosure (FIGS. 7-16), the DPF regeneration threshold can be adjusted also taking into account the information that can be derived from a navigation system, connected to the GPS device 600, that may be used in connection with the driving of the vehicle 10.

Figure 7:
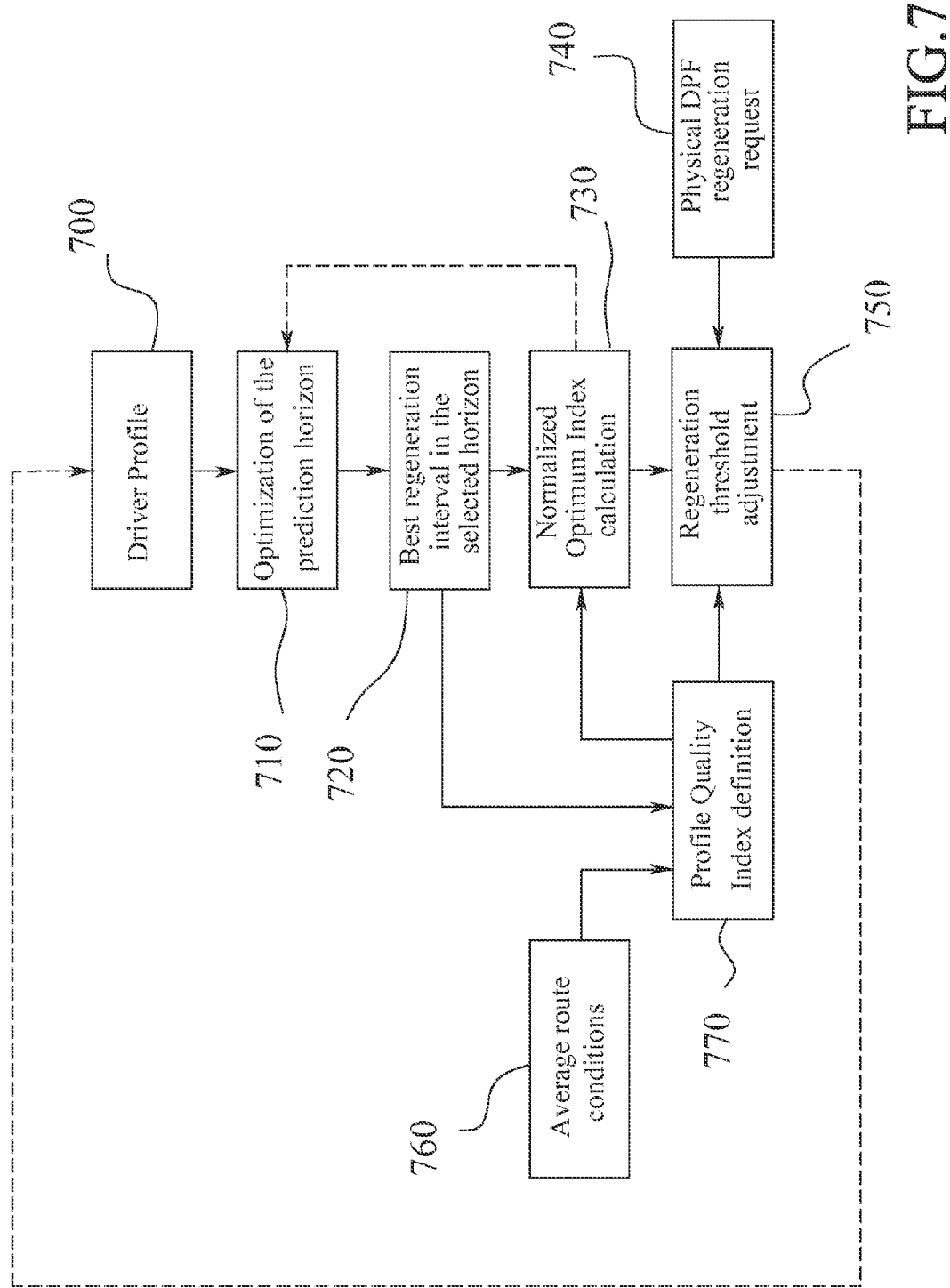
FIG. 7 is a flowchart of a further embodiment of the present disclosure.

This embodiment of the present disclosure may be schematically illustrated starting with the flowchart of FIG. 7. More specifically, the logic of this embodiment is based upon the use by the driver of the navigation system to plan a trip to reach a certain destination, in this case, the possibility to predict the kind of mission profile of the vehicle 10 is very high. This fact can be taken advantage of in order to optimize the management of the soot loading threshold to trigger the DPF regeneration.

As first step (block 700), a driver profile represented by the driver profile index DriverProfIndex, is calculated according to the procedure above described, can be used.

Figure 8:
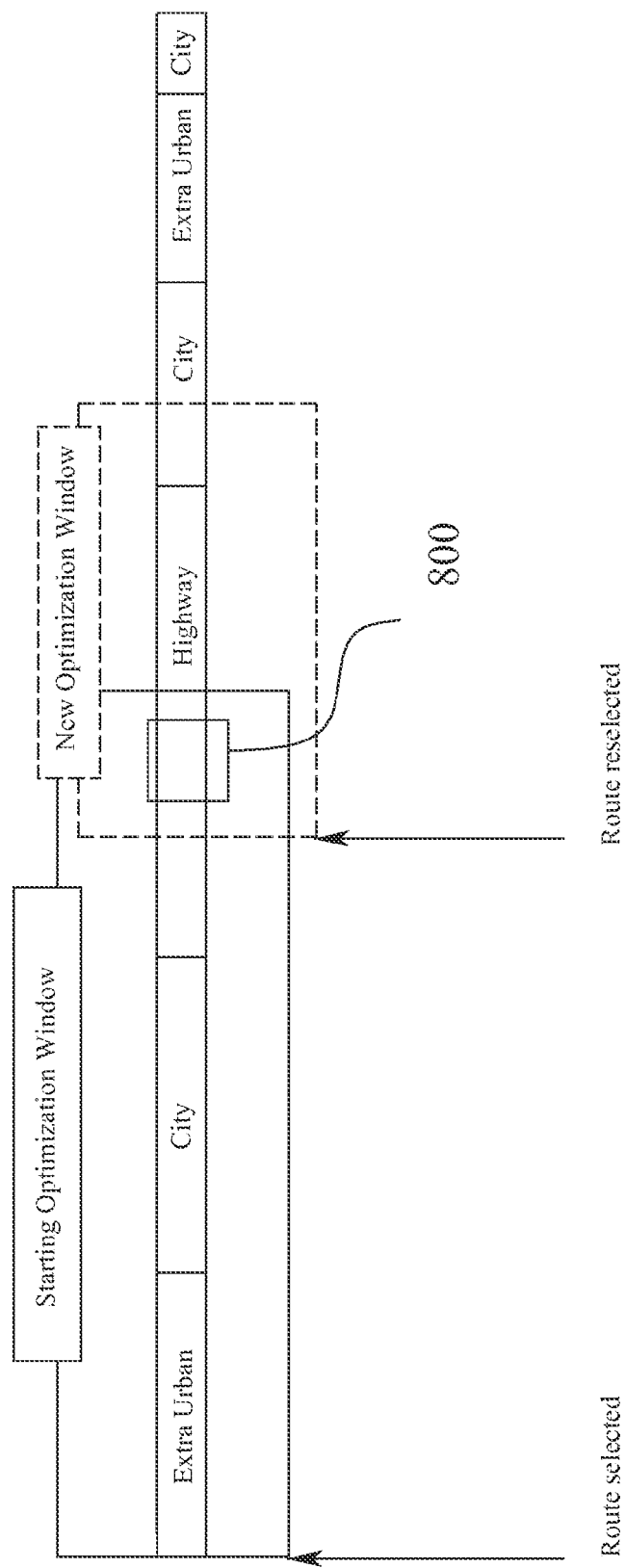
FIG. 8 is a graph detailing the choice of a best regeneration window for an embodiment of the present disclosure.

Then a time window suitable for performing a DPF regeneration is calculated (block 710) on the basis of the mission profile determined by the GPS data, considering that the route selected may consist of different portions of road in Urban, Extra Urban and Highway conditions (FIG. 8).

In the time window determined, a series of calculations that will be detailed hereinafter, are performed in order to choose the best interval to perform a DPF regeneration (Block 720). These calculations are bases on the determination of a Regeneration Optimum Index (ROI) which is an index representative of the efficiency of the regeneration as a function of the most relevant parameters that influence the regeneration, parameters that will be explained in detail with reference to FIG. 9.

On the basis of such calculations, a Profile Quality Index (PQI) can be calculated (Block 770), where the PQI is an index representative of the maximum regeneration efficiency that can be obtained in the selected mission profile. The Profile Quality Index is also calculated on the basis of the average route conditions, as selected by the navigation system (block 760), and is used to calculate a Normalized Optimum index (NOI) (block 730), given by the ratio ROI/PQI, namely normalizing the ROI of the current profile with respect to the maximum regeneration efficiency that can be obtained in the selected mission expressed by the PQI.

Finally, the regeneration threshold can be adjusted (block 750) as a function of a physical regeneration request (block 740), of the PQI and of the NOI, as detailed hereinafter. In FIG. 8, a choice of a best regeneration window 800 is shown. As a first route is selected, on the basis of such selection and considering the average regeneration time needed for each of the three defined profiles and the regeneration efficiency in each condition, a best time window 800 can be selected. This calculation can be performed, for example, by means of the following formula:

$$PQI = \text{Max}\left(\sum_{t=0}^{t=1+n} \frac{ROI(t)}{n} \ldots \sum_{t=y-n}^{t=y} \frac{ROI(t)}{n}\right)$$

where y represents the duration of the mission profile as selected by the navigation system, n represent the duration of a regeneration, t represents time and ROI (t) represents the efficacy of a regeneration in a time window t of length n inside the mission profile of length y.

For example, if y=100 minutes and n=20 minutes, t may vary from 1 to 80 in such a way to evaluate all the time windows of 20 minutes included in the 100 minutes mission profile. If the navigation system reselects a route, either by effect of a subsequent input by the driver or because the driver has taken by mistake a different route from the one selected, the index PQI is recalculated for the new mission profile.

Figure 9:
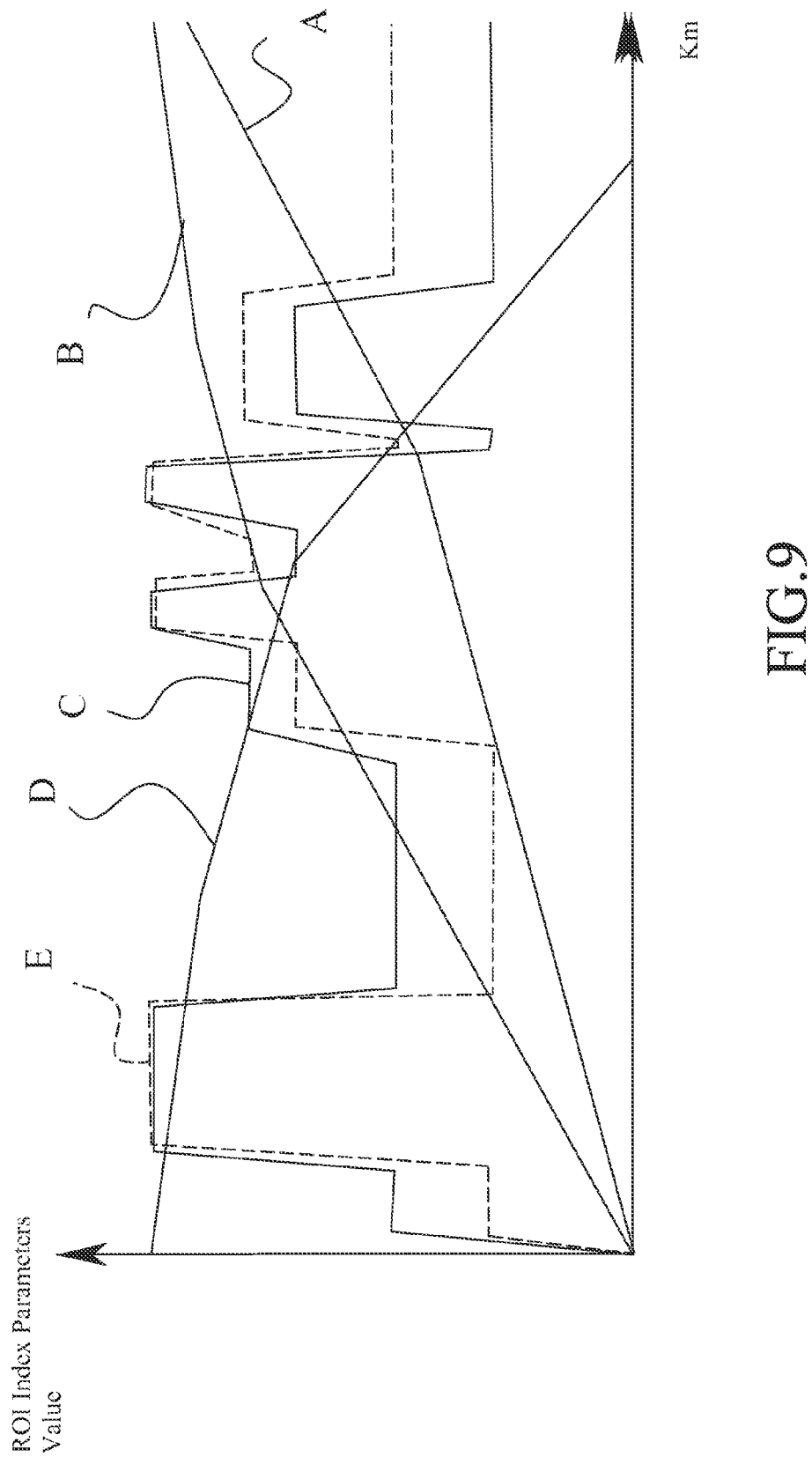
FIG. 9 is a graph indicating the parameters used to create an Regeneration Optimum Index (ROI) index useful in some embodiments of the present disclosure.

FIG. 9 is a graph indicating the parameters used to calculate the Regeneration Optimum Index (NOI). In general, the Regeneration Optimum Index (NOI) accounts for a first parameter expressing the soot loading in the DPF, or in the LNT, that generally increases during time and becomes more and more important as a function of the length of the route (curve A). A second parameter, which has a curve similar to curve A in the sense that it increases with time is the SOx loading (curve B) which is particularly relevant in case of the LNT. A third parameter is the mission profile defined in terms of probabilities of having engine idles or engine stop (curve C). A fourth parameter is the distance from the current position of the vehicle 10 to the end of the calculated route (curve D). A fifth parameter is regeneration efficiency in terms of duration, temperatures, and residual (curve E).

On the basis of the regeneration application (DPF regeneration, LNT DeNOx regeneration, LNT DeSOx regeneration), driver profile and calibration strategy, different weight distributions could be taken into account during the optimization process.

Two examples of different weight distributions are shown respectively in FIGS. 10 and 11. In FIG. 10, the NOI index is calculated without taking into account at all the SOx loading parameter and giving an important weight to the distance from the current position trying to reduce as much as possible the risk to have a change of route to a less favorable scenario. This calculation may be suitable in the case of a DPF regeneration. The second weight distribution (FIG. 11) instead, is very soot oriented trying to maximize the soot loading meeting also a good mission profile. Since the second weight distribution considers also SOx loading parameter the ROI calculation may be suitable in the case of a LNT DeSOx regeneration.

FIG. 12 represents a curve of the ROI over time when the ROI is calculated according to the weight distribution of FIG. 10. The best regeneration interval, indicated by the PQI index, is also shown in FIG. 12.

FIG. 13 represents a curve of the ROI over time when the ROI is calculated according to the weight distribution of FIG. 11. The best regeneration interval, indicated by the PQI index, is also shown in FIG. 13 and it is located in a different position with respect to the previous case.

Figure 14:
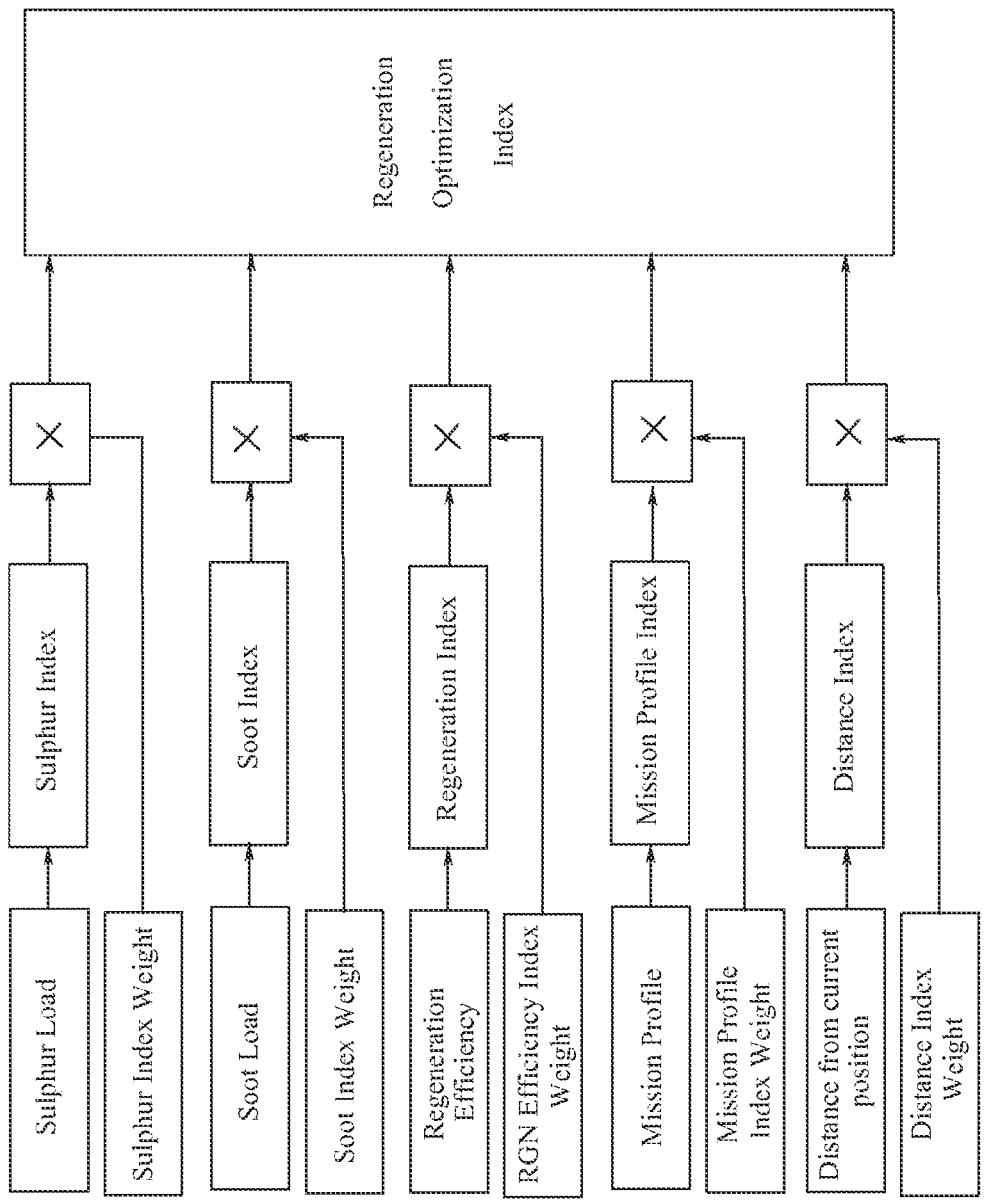
FIG. 14 represents a logic for calculating a Normalized Optimum Index (NOI), according to an embodiment of the present disclosure.

FIG. 14 represents a logic for calculating the Regeneration Optimum Index (NOI). According to the logic of FIG. 14, each of the parameter considered is normalized in order to derive a corresponding index and each index is multiplied for the corresponding weight. In order to create a measure of the quality of the current profile with respect to the maximum efficiency that can be gained in such profile, a Normalized Optimum Index (NOI) is calculated according to the following formula:

$$NOI(t) = \frac{ROI(t)}{PQI}.$$

Figure 15:
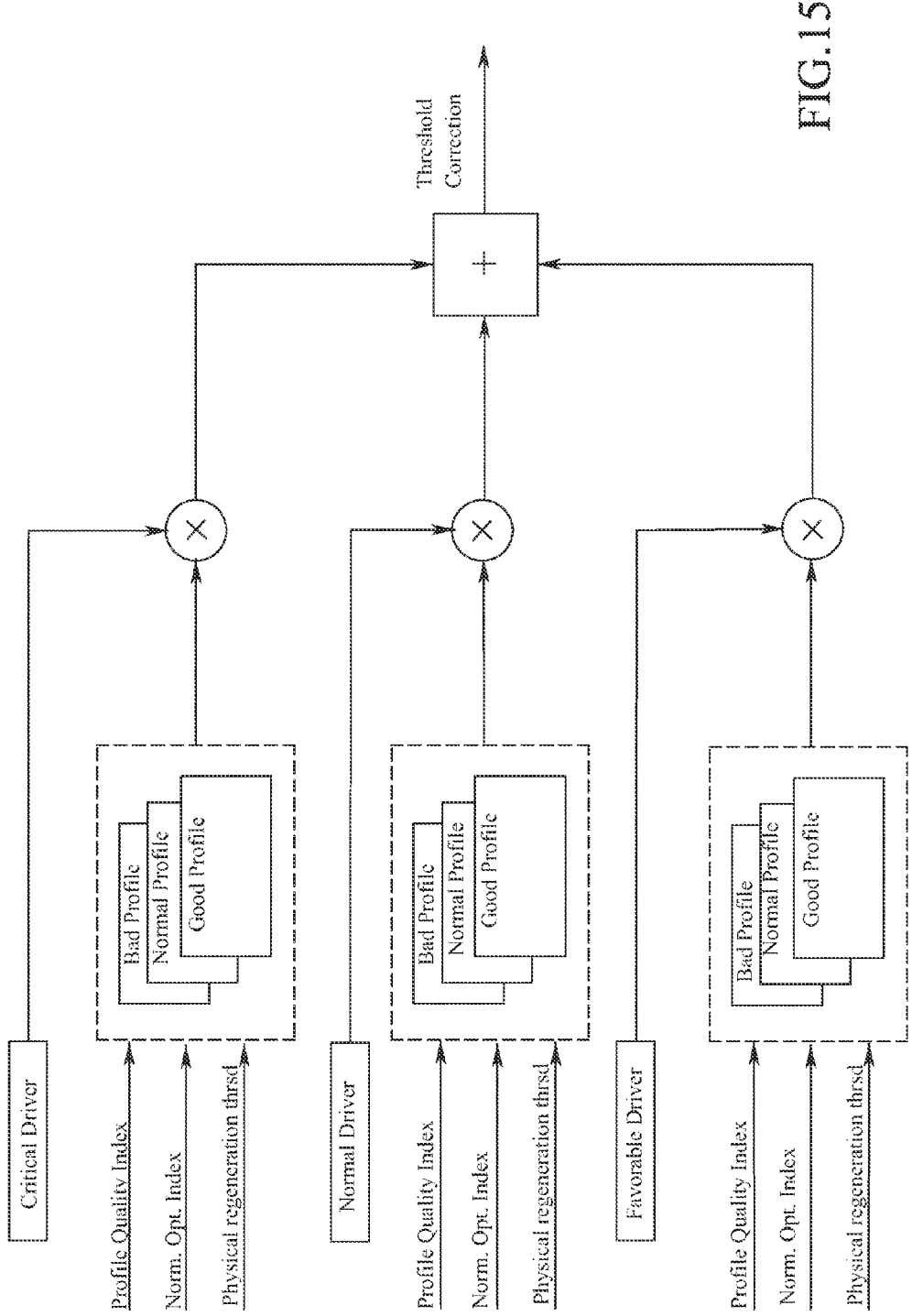
FIG. 15 is a flowchart detailing a logic of a further embodiment of the present disclosure.

At this point, the ECU 450 has available all the information needed to adjust the physical threshold for starting the DPF regeneration as a function of the driver profile index, the Profile Quality Index (PQI), the Normalized Optimum Index (NOI), in order to start the DPF regeneration in a time period where better conditions in terms of efficiency and duration with respect to the prior art can be found. These variables and their relationship are schematically depicted in FIG. 15.

On the basis of the driver profile index, the ECU 450 identifies the type of driver currently driving the vehicle 10, for example, a Critical Driver or a Normal Driver or an Extra Urban in the same way as in the previous embodiment of the present disclosure. The ECU 450, on the basis of the driver profile identified, then analyzes the Profile Quality Index (PQI). The Profile Quality Index (PQI) may be useful to distinguish between three conditions which include: bad profile (short duration, mainly urban, low average efficiency, low maximum efficiency window); normal profile (medium duration, mixed one, urban, extra urban, medium average efficiency, medium maximum efficiency window); good profile (high duration, mainly extra urban and highway, high average efficiency, high max efficiency window). Then the ECU 450 considers the Normalized Optimum Index (NOI) for the current mission profile.

With these information, the ECU 450 can now decide if it is convenient to modify the instant which the DPF regeneration will start or not. In many cases, according to the various embodiment of the present disclosure, the ECU 450 may decide to modify by anticipating or by delaying the start of the regeneration to meet the best conditions to perform the regeneration.

Figure 16:
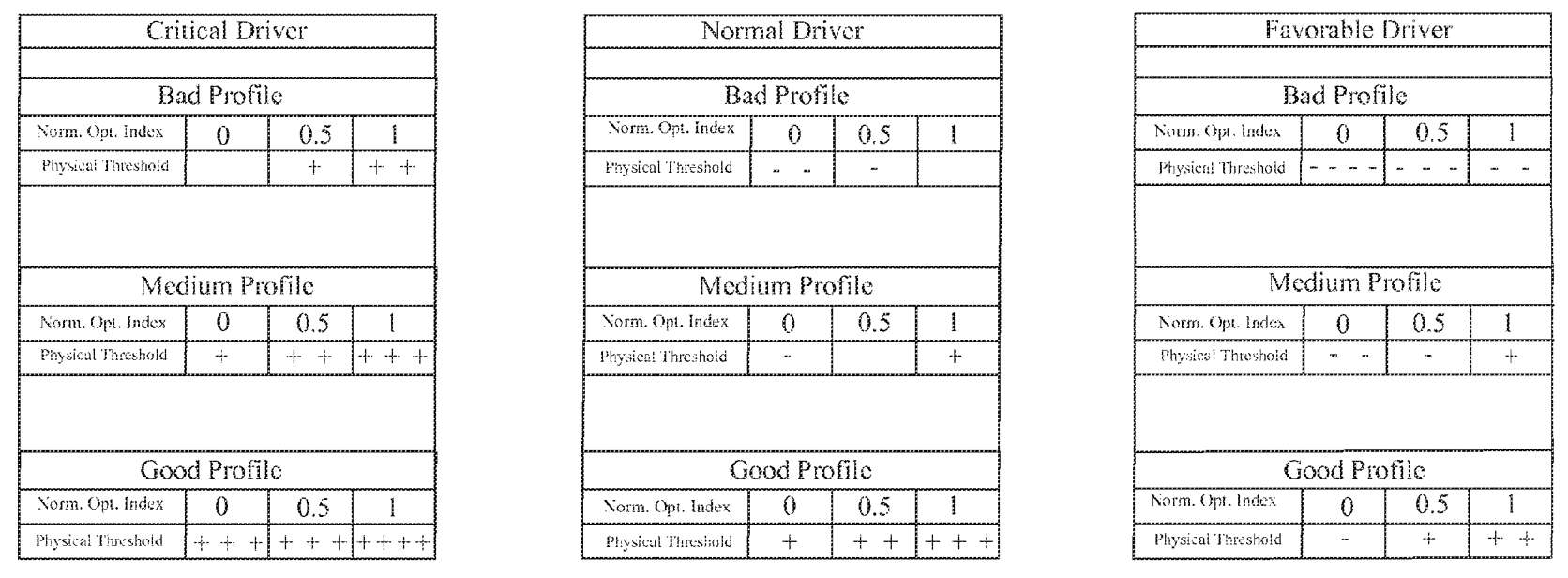

As a convention, in the table of FIG. 16 a negative or "−" sign indicates the opportunity of delaying the regeneration with respect to the physical threshold, or the ECU 450 may decide to anticipate the physical threshold, and in this case in the table of FIG. 16 a positive or "+" sign indicates the opportunity of anticipating the regeneration with respect to the physical threshold. The amount by which the physical threshold is delayed or anticipated may vary, depending on the conditions, and these variations are expressed by the number of "+" or "−" signs for each of the possible cases that the ECU 450 may encounter.

For example, a "normal" driver, as soon as he or she uses the navigation system to plan a trip on highway, will trigger a request of a DPF or a LNT regeneration even if the physical logic wouldn't take a lot of advantages respect to the normal regeneration conditions. If the recognized type of user instead is a "favorable" one, the strategy will try to avoid to have a regeneration in a urban profile and will try to trigger it in the best part of an extra urban/highway profile.

In general, the ECU will anticipate the regeneration with respect to the physical threshold more in case of an high value of the Normalized Optimum Index (NOI). Once the type and the entity of the adjustment is determined, the ECU 450 is ready to perform a regeneration when the instant in time corresponding to the adjusted threshold occurs.

In the previous description, the values of the various parameters mentioned are intended in an exemplificative and non-limitative way, since different values may appropriate for different automotive systems and GPS devices, without departing from the various embodiments of the present disclosure.

While at least one exemplary embodiment has been presented in the foregoing summary and detailed description, it should be appreciated that a vast number of variations exist. As an example, the man skilled in the art will easily see that the description, although tailored to Diesel engines with associated DPFs, can also be used with ICEs running with gasoline, where the exhaust gases of the gasoline engine need to be purified by a gasoline particle filter (GPF). It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A control apparatus for optimizing the regeneration of an aftertreatment device located in an exhaust pipe of an internal combustion engine of a vehicle, wherein the control apparatus comprises an Electronic Control Unit configured to:
   collect data from a GPS device associated to the vehicle;
   calculate a physical threshold for starting a regeneration of the aftertreatment device;
   determine a driver profile index representative of at least one of a driver profile on the basis of data collected by the GPS device;
   determine a mission profile index representative of a current mission profile of the vehicle on the basis of data collected by the GPS device;
   determine a confidence index representative of the probability of starting and terminating the regeneration in the current mission profile; and
   adjust the physical threshold for starting the regeneration as a function of at least one of the driver profile index, the mission profile index or the confidence index;
   set the adjusted threshold as a regeneration time period; and
   initiate the regeneration of the aftertreatment device within the regeneration time period.

2. The control apparatus as in claim 1, wherein the Electronic Control Unit is configured to determine the driver profile index as a function of the percentage of time spent in each mission profile.

3. The control apparatus as in claim 1, wherein the Electronic Control Unit is configured to determine the mission profile index as a function of speed limit data read from the GPS device.

4. The control apparatus as in claim 1, wherein the Electronic Control Unit is configured to determine the confidence index as a function of the average time necessary for an aftertreatment device regeneration, the average time spent in each mission profile and a safety margin.

5. The control apparatus as in claim 1, wherein the Electronic Control Unit is configured to determine the mission profile index as a function of a route calculated by a navigation system using the GPS device.

6. The control apparatus as in claim 5, wherein the Electronic Control Unit is configured to determine an efficacy index representative of the efficacy of a regeneration in a time window having a length equal to the duration of a regeneration of the aftertreatment device.

7. The control apparatus as in claim 6, wherein the Electronic Control Unit is configured to determine a normalized regeneration index according to the following formula:

$$NOI(t) = \frac{ROI(t)}{PQI}$$

wherein ROI (t) is the efficacy index and PQI is the mission profile index.

8. The control apparatus as in claim 1, wherein the Electronic Control Unit is configured to:
   determine an efficacy index representative of the efficacy of a regeneration in a time window having a length equal to the duration of a regeneration of the aftertreatment device; and
   adjust the physical threshold for starting the regeneration as a function of the efficacy index and at least one of the driver profile index, the mission profile index or the confidence index.

9. The control apparatus as in claim wherein 1, the Electronic Control Unit is configured to start the regeneration of a particle filter according to the adjusted physical threshold.

10. The control apparatus as in claim 1, wherein the Electronic Control Unit is configured to start the regeneration of a Lean $NO_x$ Trap according to the adjusted physical threshold.

11. The control apparatus according to claim 1 wherein the Electronic Control Unit is configured to adjust the physical threshold for starting the regeneration as a function of the driver profile index, the mission profile index and the confidence index.

12. An vehicular system comprising:
   a GPS device associated to the vehicle;
   an internal combustion engine having an exhaust pipe in a vehicle;
   an aftertreatment device located in the exhaust pipe; and
   an Electronic Control Unit operable to control the internal combustion engine, the Electronic Control Unit configured to:
     collect data from a GPS device associated to the vehicle;
     calculate a physical threshold for starting a regeneration of the aftertreatment device;
     determine a driver profile index representative of at least one of a driver profile on the basis of data collected by the GPS device;
     determine a mission profile index representative of a current mission profile of the vehicle on the basis of data collected by the GPS device;
     determine a confidence index representative of the probability of starting and terminating the regeneration in the current mission profile; and
     adjust the physical threshold for starting the regeneration as a function of at least one of the driver profile index, the mission profile index or the confidence index;
     set the adjusted threshold as a regeneration time period; and
     initiate the regeneration of the aftertreatment device within the regeneration time period.

13. The vehicular system according to claim 12 wherein the Electronic Control Unit is configured to adjust the physical threshold for starting the regeneration as a function of the driver profile index, the mission profile index and the confidence index.

14. A non-transitory, computer-readable data storage medium storing a computer program code, which when executed on a computer, performs the method according to claim 13.

15. A method of optimizing the regeneration of an aftertreatment device located in an exhaust pipe of an internal combustion engine of a vehicle, the method comprising:
- collecting data from a GPS device associated to the vehicle;
- calculating a physical threshold for starting a regeneration of the aftertreatment device;
- determining a driver profile index representative of at least one of a driver profile on the basis of data collected by the GPS device;
- determining a mission profile index representative of a current mission profile of the vehicle on the basis of data collected by the GPS device;
- determining a confidence index representative of the probability of starting and terminating the regeneration in the current mission profile; and
- adjusting the physical threshold for starting the regeneration as a function of at least one of the driver profile index, the mission profile index or the confidence index;
- setting the adjusted threshold as a regeneration time period; and
- initiating the regeneration of the aftertreatment device within the regeneration time period.

16. The method according to claim 15 further comprising adjusting the physical threshold for starting the regeneration as a function of the driver profile index, the mission profile index and the confidence index.

* * * * *